United States Patent
Stewart

(10) Patent No.: US 11,872,834 B2
(45) Date of Patent: Jan. 16, 2024

(54) METHODS FOR DESIGNING AND PRODUCING A SECURITY FEATURE

(71) Applicant: Koenig & Bauer Banknote Solutions SA, Lausanne (CH)

(72) Inventor: Robert Laird Stewart, La Tour de Peilz (CH)

(73) Assignee: Koenig & Bauer Banknote Solutions SA, Lausanne (CH)

( * ) Notice: Subject to any disclaimer, the term of this patent is extended or adjusted under 35 U.S.C. 154(b) by 0 days.

(21) Appl. No.: 17/921,198

(22) PCT Filed: Apr. 28, 2021

(86) PCT No.: PCT/EP2021/061157
§ 371 (c)(1),
(2) Date: Oct. 25, 2022

(87) PCT Pub. No.: WO2021/219735
PCT Pub. Date: Nov. 4, 2021

(65) Prior Publication Data
US 2023/0166557 A1   Jun. 1, 2023

(30) Foreign Application Priority Data

Apr. 28, 2020   (GB) .................... 2006219

(51) Int. Cl.
*H04N 1/58*   (2006.01)
*B42D 25/485*   (2014.01)
(Continued)

(52) U.S. Cl.
CPC ............. *B42D 25/485* (2014.10); *B41M 3/14* (2013.01); *G02B 3/0031* (2013.01);
(Continued)

(58) Field of Classification Search
CPC ... B41M 3/14; G02B 3/0056; H04N 1/32267; B42D 25/30; B42D 25/328
(Continued)

(56) References Cited

U.S. PATENT DOCUMENTS

| 6,091,482 A * | 7/2000 | Carter ................ H04N 1/00201 |
| | | 348/E13.043 |
| 2005/0057664 A1* | 3/2005 | Palum .................. H04N 3/1593 |
| | | 348/222.1 |

(Continued)

FOREIGN PATENT DOCUMENTS

| EP | 0 886 437 A2 | 12/1998 |
| JP | 2001-103282 A | 4/2001 |

(Continued)

OTHER PUBLICATIONS

Examination Report for AU Application No. 2021263958 dated Nov. 14, 2022.

(Continued)

*Primary Examiner* — Jamares Q Washington
(74) *Attorney, Agent, or Firm* — Wolf, Greenfield & Sacks, P.C.

(57) ABSTRACT

Methods for designing and producing a security feature are provided. In general, the present disclosure provides methods of designing a printed image in a security feature, the security feature comprising an array of optical elements overlaying the printed image, wherein the printed image comprises a two dimensional matrix of rows and columns of pixels, the method comprising; correcting for a mismatch between the pixels of the printed image and the array of optical elements by doing one or more of: adding one or more pixels; removing one or more pixels; and moving one or more pixels.

25 Claims, 6 Drawing Sheets

(51) Int. Cl.
*B41M 3/14* (2006.01)
*G02B 3/00* (2006.01)
*H04N 1/32* (2006.01)
*B42D 25/324* (2014.01)
*B42D 25/328* (2014.01)

(52) U.S. Cl.
CPC ....... *G02B 3/0056* (2013.01); *H04N 1/32267* (2013.01); *B42D 25/324* (2014.10); *B42D 25/328* (2014.10); *H04N 2201/3233* (2013.01); *H04N 2201/3271* (2013.01); *H04N 2201/3284* (2013.01)

(58) Field of Classification Search
USPC .................. 358/3.24, 3.26, 3.28, 1.18; 430/1
See application file for complete search history.

(56) References Cited

U.S. PATENT DOCUMENTS

| | | |
|---|---|---|
| 2008/0079761 A1 | 4/2008 | Furuya |
| 2010/0182221 A1 | 7/2010 | Kaule et al. |
| 2011/0209328 A1 | 9/2011 | Steenblik et al. |
| 2012/0314259 A1 | 12/2012 | Hosaka |
| 2014/0177008 A1* | 6/2014 | Raymond ............ G02B 3/0037 359/619 |
| 2016/0086066 A1 | 3/2016 | Porras Soto et al. |
| 2019/0217652 A1 | 7/2019 | Raymond et al. |

FOREIGN PATENT DOCUMENTS

| | | |
|---|---|---|
| JP | 2018-026714 A | 2/2018 |
| WO | WO 2007/076952 A2 | 7/2007 |
| WO | WO 2008/008635 A2 | 1/2008 |
| WO | WO 2010/004946 A1 | 1/2010 |
| WO | WO 2014/039476 A1 | 3/2014 |

OTHER PUBLICATIONS

Combined Search and Examination Report under Sections 17 and 18(3) for GB Application No. GB2006219.6 dated Oct. 30, 2020.
Search Report under Section 17(6) for GB Application No. GB2006219.6 dated May 7, 2021.
Intention to Grant under Section 18(4) for GB Application No. GB2006219.6 dated Mar. 1, 2022.
International Search Report and Written Opinion for International Application No. PCT/EP2021/061157 dated Oct. 13, 2021.

* cited by examiner

METHODS FOR DESIGNING AND PRODUCING A SECURITY FEATURE

CROSS-REFERENCE TO RELATED APPLICATIONS

This application is a national stage filing under 35 U.S.C. § 371 of International Application No. PCT/EP2021/061157, filed Apr. 28, 2021, which claims the benefit of United Kingdom Application No. GB 2006219.6, filed Apr. 28, 2020, each of which is hereby incorporated herein by reference in its entirety.

FIELD OF THE INVENTION

Many documents contain security features that assist with identifying counterfeit or forged documents. Many of these documents will contain security features that utilise micro-optics as such features are typically difficult to copy with the precision needed to produce a convincing forgery.

The micro-optics used in these documents often comprise an array of optical elements overlying a printed image made up of pixels. It is often desired to produce visually distinct images and/or animations using the micro-optics.

Micro-optics are subject to pitch drift as a result of the mismatch between the printed image and an array of optical elements. Even very accurate arrays will accumulate enough mismatch across the extent of a typical security feature to account for several frames of an animation, which results in animations which are not consistent across the width or height of the feature. This manifests as a rippling effect as the security feature is tilted. The present invention provides systems and methods for correcting pitch drift in micro-optics.

BACKGROUND

WO 2014/039476 A1 relates to pixel mapping, arranging, and imaging for micro lens arrays. Methods of stretching and compressing an image using photoshop to match the pitch of the lens array with the interlaced image are discussed. It is also considered to remove pixels from "low information areas". Removing pixels from low information areas may result in one part of the image being disproportionately affected, resulting in noticeable visual irregularities to a user.

SUMMARY OF THE INVENTION

In an aspect of the invention, the present disclosure provides a method of designing a printed image in a security feature, the security feature comprising an array of optical elements overlaying the printed image, wherein the printed image comprises a two dimensional matrix of rows and columns of pixels, the method comprising; correcting for a mismatch between the pixels of the printed image and the array of optical elements by doing one or more of: adding one or more pixels; removing one or more pixels; and moving one or more pixels.

In an aspect of the invention, the present disclosure provides a method of designing a printed image in a security feature, the security feature comprising an array of optical elements overlaying the printed image, wherein the printed image comprises a two dimensional matrix of rows and columns of pixels, the method comprising: calculating for each row and column at least one drift value, wherein the drift value for any pixel is equal to the difference between an actual position for said pixel and the desired position for said pixel; determining, based on said at least one drift value, one or more locations in the printed image to remove a pixel from the printed image and/or to add a pixel to the printed image; and adding or removing pixels at the one or more locations; wherein the one or more locations are determined by calculating a number of pixels to be removed from or added to the printed image and randomly selecting that number of locations. This provides a reduction in the drift value of pixels across the printed image and therefore reduces the number of locations where a user sees a pixel that is different from the intended pixel. Selecting the locations randomly prevents the formation of grids of corrections in the final design.

In an embodiment of the invention, the method comprises for each of the one or more locations, if the drift value is positive, removing a pixel, and if the drift value is negative, adding a pixel. This ensures that the correction minimises the resulting drift value at the location where the correction is made.

In another embodiment of the invention, for each row and column in the printed image, the step of calculating the number of pixels to be removed from or added to the printed image comprises: determining a greatest drift value in the row or column; calculating an alteration number equal to the greatest drift value divided by a width of one of the pixels and then rounded to the nearest integer; and setting the number of pixels to be removed from or added to the printed image as equal to alteration number. This ensures that the total correction made to each row and column results in a drift value at the end of that row or column that is as close to zero as possible. This reduces pitch drift in the final design. Selecting locations randomly reduces the chance of any one area of the image being affected multiple times in multiple rows, thus reducing the chances of grids of corrected pixels forming in the final design.

In another embodiment of the invention, each row and column is divided into segments of equal length, wherein the number of segments is equal to the number of pixels to be removed from or added to the printed image, and wherein randomly selecting that number of locations comprises randomly selecting one location in each segment. Dividing the each row and column into segments creates a more even distribution of correction locations than when using a random selection of locations across the entire row or column. Thus the segments help reduce pitch drift in the final design while still avoiding the problems of grids forming.

In another embodiment of the invention, each of the one or more locations is limited to be within a set distance of a pixel with a target drift value. This allows yet more precise control of where the corrections occur, but still maintains sufficient randomness to avoid the formation of grids in the final design. As the set value can be varied depending on the desired result, this is a flexible approach that allows control of how random the pitch drift in the final design is.

In another embodiment of the invention, the matrix of rows and columns of pixels comprises virtual pixels, wherein each virtual pixel comprises a plurality of adjacent pixels, and wherein adding a pixel comprises adding a virtual pixel, and wherein removing a pixel comprises removing a virtual pixel. The use of virtual pixels reduces the pitch problems discussed because, if a pixel within a larger virtual pixel drifts into another pixel forming part of the virtual pixel, this will not be noticeable to the user. Therefore, the use of virtual pixels reduces the number of locations in an image where a different pixel to the intended pixel is visible to a user.

In another embodiment of the present invention, the virtual pixel comprises a 2×2 block of pixels. As detailed above, this will reduce the number of locations where a user sees a different pixel to the intended pixel. In the cases of 2×2 blocks of pixels, the errors may be reduced by up to a factor of four (a factor of two in each of the rows and columns).

In another embodiment of the present invention, after the step of adding or removing pixels at the one or more locations, the printed image is analysed to determine if any pixels have a drift value greater in magnitude than a threshold value, and wherein a pixel with a drift value greater in magnitude than the threshold value is corrected by:

removing said pixel; or adding a pixel; or determining an action to minimise pixel error, and then carrying out said action. These correction techniques allow any error introduced in correcting for pitch drift to be reduced in the final design. By applying these corrections after the methods detailed above, the randomness of the corrections is maintained, preventing the formation of grids, but also maintaining that no individual pixel or group of pixels has too great a drift value once the correction has been applied.

In another embodiment of the present invention, the printed image comprises a series of frames, wherein the frames are different frames of an animation or different perspective views of an image, and wherein the frames are interlaced in the two dimensional matrix.

In another aspect of the present invention, there is disclosed a method of designing a printed image in a security feature, the security feature comprising an array of optical elements overlaying the printed image, wherein the printed image comprises a two dimensional matrix of rows and columns of pixels, the method comprising: calculating for each row and column at least one drift value, wherein the drift value for a pixel is equal to the difference between an actual position for said pixel and the desired position for said pixel; determining, based on said at least one drift value, one or more locations in the printed image to remove a pixel from the printed image and/or to add a pixel to the printed image; and adding or removing pixels at the one or more locations; wherein each optical element is associated with a group of pixels, wherein each of the one or more locations is selected from a group of pixels which contains a pixel having a drift value associated with a specified drift value. Performing a correction at regular intervals across an image allows the average drift value of pixels to be minimised, thus reducing the number of locations where a user sees a different pixel from the intended pixel.

In an embodiment of the present invention, the method comprises for each of the one or more locations, if the drift value is positive, removing a pixel, and if the drift value is negative, adding a pixel. This ensures that the correction minimises the resulting drift value at the location where the correction is made.

In another embodiment of the present invention, adding or removing pixels comprises either: removing a pixel from the edge of each group of pixels; or adding a pixel at the edge of each group of pixels. As the edges of the groups of pixels are associated with the most extreme viewing angles of the security feature, adding or removing pixels at the edge of each group of pixels results in the central, most noticeable viewing angles, being less affected by pitch drift.

In another embodiment of the present invention, adding or removing pixels comprises either: removing a random pixel from each group of pixels; or adding an additional pixel to each group of pixels, wherein the additional pixel is inserted into each group of pixels at a random point within the group. The adjustment is shared across all the frames, and this is especially beneficial in images with a lot of frames, as the adjustment is less noticeable in any given frame.

In another embodiment of the present invention, adding or removing pixels comprises either: removing a least significant pixel from each group of pixels; or adding an additional pixel to each group of pixels, wherein the additional pixel is the least significant pixel in the group once it has been inserted into the group. This approach minimises the amount of information lost or added when correcting for pitch drift.

In another embodiment of the present invention, the magnitude of the specified drift value for each of the one or more locations is equal to (n+0.5)w, wherein n is an integer and w is the width of a pixel. Setting the specified drift value at this magnitude minimises the magnitude of the average drift value to the greatest extent possible because when a drift value of 0.5 is reached, the value drops to −0.5 (or vice versa if the drift is negative). As such, once this method has been applied every pixel will have a drift value between −0.5 and 0.5 and this will result in an improved viewing experience for the user as they will see a different pixel from the intended pixel in fewer locations in the printed image.

In another embodiment of the present invention, the printed image comprises a series of frames, wherein the frames are different frames of an animation or different perspective views of an image, and wherein the frames are interlaced in the two dimensional matrix.

In another aspect of the present invention, there is disclosed a method of designing a printed image in a security feature, the security feature comprising an array of optical elements overlaying the printed image, wherein the printed image comprises a two dimensional matrix of rows and columns of pixels, the method comprising: identifying a plurality of objects within the printed image, wherein each of the plurality of objects comprises one or more pixels; wherein at least one of the plurality of objects is adjusted by moving all the pixels in the object a first specified distance. This allows individual objects within the printed image to be corrected selectively to provide desirable effects with very low levels of pitch drift.

In another embodiment of the present invention, a second object of the plurality of objects is adjusted by moving all the pixels in the second object a second specified distance, wherein the second specified distance is different from the first specified distance. As the corrections are applied selectively, this allows multiple effects to be present within the same image. The multiple effects may include rippling in multiple directions, and a sharp change.

In another embodiment of the present invention, the distance an object is moved is based on that object's location in the printed image. This allows objects in different parts of the image to be adjusted such that they may have very similar drift values after the adjustment and will therefore display the same effect.

In another embodiment of the present invention, the printed image comprises a series of frames, wherein the frames are different frames of an animation or different perspective views of an image, and wherein the frames are interlaced in the two dimensional matrix, and wherein for each object in the plurality of objects, identifying an object comprises: determining that the object comprises all pixels representative of a feature across all frames. This makes it easier to keep track of which pixels belong to which object, and ensures that the same adjustment is applied to all pixels in the object.

In another aspect of the present invention, there is disclosed a method of producing a printed image in a security feature comprising: designing the printed image in the security feature according to the method of any preceding claim; and fabricating the security feature.

In another aspect of the present invention, there is disclosed a security feature comprising a printed image, wherein the printed image is designed according to any of the methods described herein.

In another embodiment of the present invention, the security feature further comprises an array of optical elements.

In another aspect of the invention, there is disclosed a security document comprising any of the security features described herein.

In another aspect of the invention, there is disclosed a non-transitory computer readable medium storing computer readable instructions which, when executed, cause a machine comprising a processor to perform any of the methods of designing a printed image in a security feature described herein.

DETAILED DESCRIPTION

Certain exemplary embodiments will now be described to provide an overall understanding of the principles of the structure, function, manufacture, and use of the devices, systems, and methods disclosed herein. One or more examples of these embodiments are illustrated in the accompanying drawings. A person skilled in the art will understand that the devices, systems, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Figure 1:
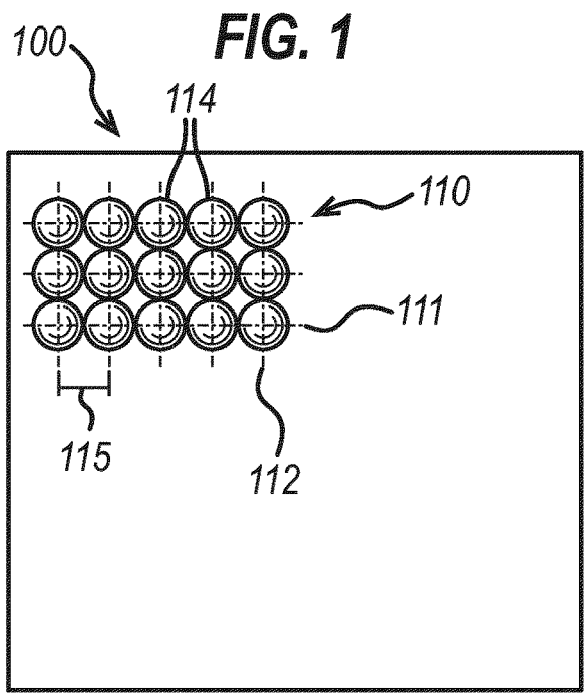
FIG. 1 is a plan view of a security feature according to the present invention.

FIG. 1 shows an exemplary security feature 100 comprising an array 110 of optical elements 114 having a width 115. Each array comprises a plurality of optical elements 114 arranged in parallel rows 111 and columns 112. In some preferred embodiments, the optical elements may be lenses, and the array of optical elements may be an array of lenses. In a further preferred embodiment the lenses may be round lenses. In another preferred embodiment the lenses may be square lenses. In other embodiments the lenses may of other shapes that tessellate, for example hexagonal lenses. In another embodiment the lenses may be flat lenses. In some embodiments the flat lenses may comprise Fresnel, holographic, or diffractive lenses. Many shapes of lenses are envisaged as being used, and the above described embodiments should not be interpreted as limiting.

Figure 2:
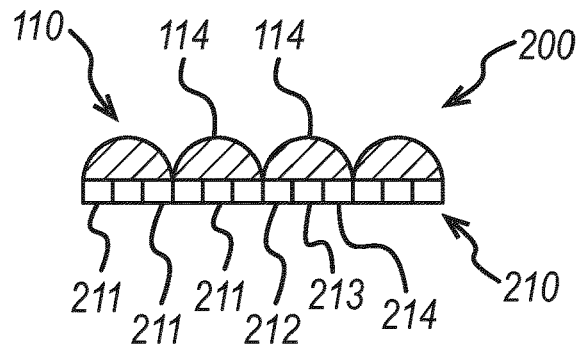
FIG. 2 is a cross-sectional view of a security feature according to the present invention.

FIG. 2 shows an exemplary security feature 200 comprising an array 110 of optical elements 114 overlaying a printed image 210, wherein the printed image comprises a two dimensional matrix of rows and columns of pixels 211. The printed image may comprise a series of frames, wherein the frames may be different frames of an animation or different perspective views of an image, and wherein the frames may be interlaced in both dimensions of the two dimensional matrix. This interlacing means that a user will see a pixel from a different frame 212, 213, 214, 215 depending on the angle from which they view the security feature 200. This way, as the user tilts the security feature (or otherwise changes their position relative to the security feature), they will see different frames, either giving the impression of an animated image (if the frames are frames of an animation) or giving a false three dimensional effect (if the different frames are different perspective views of an image).

Typically, the security feature may be fabricated by printing the pixels onto a substrate to form the printed image and then overlying the substrate with an array of optical elements. In some embodiments the security feature may comprise printing the printed image on a first side of a polymer film and applying an array of optical elements to the other side of the polymer film. In some embodiments, an array of optical elements may be applied as sheets or directly cast on top of a printed image. In some embodiments the security feature may comprise an array of optical elements that focus onto an internal surface of the security feature.

In principle, it would be ideal to produce optical elements and pixels to the exact dimensions that are designed, and that the width of an optical element would be an integer multiple of the width of a pixel such that an integer number of pixels fit exactly under each optical element. For example, a typical optical element may have a nominal design size of 70 microns, and a pixel may have a nominal design size of 2.5 microns which would result in 28 rows (or columns) of pixels under each optical element. This would lead to the viewing experience described above, wherein a user will see a different frame depending on the angle from which they view the security feature 200, and they would see the same pixels from only one frame across the entire image.

In practice, when a security feature such as security feature 200 is designed and fabricated, there may be a mismatch between the printed image 210 and the array 110 of optical elements 114 due to differences between the nominal design size of the optical elements 114 and the actual size of the optical elements 114. The average size of a manufactured optical element 114 may be compared to the nominal design size of an optical element 114 to calculate the difference between the nominal design size of an optical element 114 and the actual size of an optical element 114.

The above described difference between the nominal design size of the optical elements and the actual size of the optical elements leads to a mismatch between the desired position for any pixel, relative to the optical array, and the actual position of that pixel. To expand on the example given above, if an optical element has an nominal design size of 70 microns, but the actual size of an optical element 114 is around 0.06 microns greater than or less than the nominal design size of an optical element 114, then across a 25*mm* optic there will be 357 lenses giving a total inaccuracy of 21.4 microns, which is between 8 and 9 pixels where the pixel size is 2.5 microns. As a result of this mismatch, when viewing the image from a given angle, the pixels visible through the optical array across different parts of the image are associated with different frames — that is to say, rather than viewing a single frame across the security feature at the same time, different frames will be visible at different locations across the security feature.

A 'drift value' for each pixel is equal to the difference between an actual position for said pixel and the desired position for said pixel. In some embodiments a drift value for each pixel may be defined as the desired position for that pixel subtracted from the actual position for that pixel. As the actual position may be greater than the desired position or less than the desired position, the drift value may be positive or negative. The above definition of the drift value will be used herein. It will be understood that a drift value for each pixel may equivalently be defined as the actual position for a pixel subtracted from the desired position for the pixel, and that this would result in the drift value being negative where it is referred to as positive herein, and the drift value would be negative where it is referred to as positive herein.

In one embodiment, at least one drift value is calculated for each row and column. It will be understood that the drift value may vary between rows and columns. In some embodiments the drift values may be the same for each row. In other embodiments the drift values may vary between rows. In some embodiments the drift values may be the same for each column. In some embodiments the drift values may vary between columns. In some embodiments the drift values along a row may vary from drift values down a column.

Figure 3:
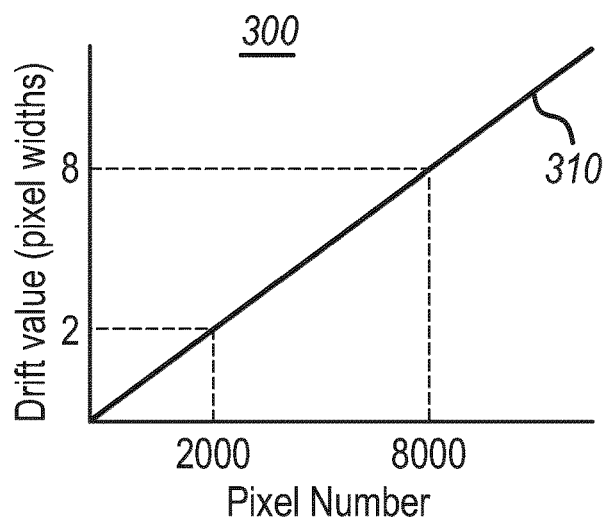
FIG. 3 is a graph depicting the drift value of pixels in a security feature.

FIG. 3 shows the drift value across an image in the form of graph 300. As one moves across or down an image, the drift value grows in magnitude, as depicted by line 310 showing that as pixel number increases, there is a linear increase in the drift value. Alternatively, if the drift value is negative, the line 310 shown in graph 300 would be mirrored in the x-axis and would slope downwards. As this increase in drift value is what causes a user to see different frames at the same time, it is desirable to correct this drift.

The inventor has found that the problem of drift may be overcome by correcting for the mismatch between the pixels of the printed image and the array of optical elements by doing one or more of; adding one or more pixels; removing one or more pixels; and moving one or more pixels. Various methods for implementing these techniques are detailed herein.

In a first aspect of the present invention, a method of designing a printed image 210 in a security feature 200 comprises determining, based on at least one drift value, one or more locations in the printed image 210 to remove a pixel 211 from the printed image 200 or to add a pixel 211 to the printed image 200. Adding and removing pixels 211 from the printed image 200 shifts the drift value by one pixel width at the location where the pixel 114 is added or removed. Where the drift value is positive, this means that a pixel 114 is further along the row or column than its desired position. When the drift value is positive, removing a pixel 114 will decrease the drift value of subsequent pixels. Conversely, if the drift value is negative, this means a pixel 114 is not as far along the row or column as its desired position. When the drift value is negative, adding a pixel will increase the drift value of all subsequent pixels. These options can be used to reduce the magnitude of the drift value across the printed image 200, and consequently there will be fewer locations where a user sees a different frame from the intended frame. Embodiments according to this aspect of the invention may be referred to as 'long pitch correction'.

In one embodiment of the present invention, the one or more locations where pixels 114 are added or removed are randomly selected. The one or more locations may be randomly selected using a random number generator. This prevents the formation of lines that arise from systematically selecting locations.

Figure 4:
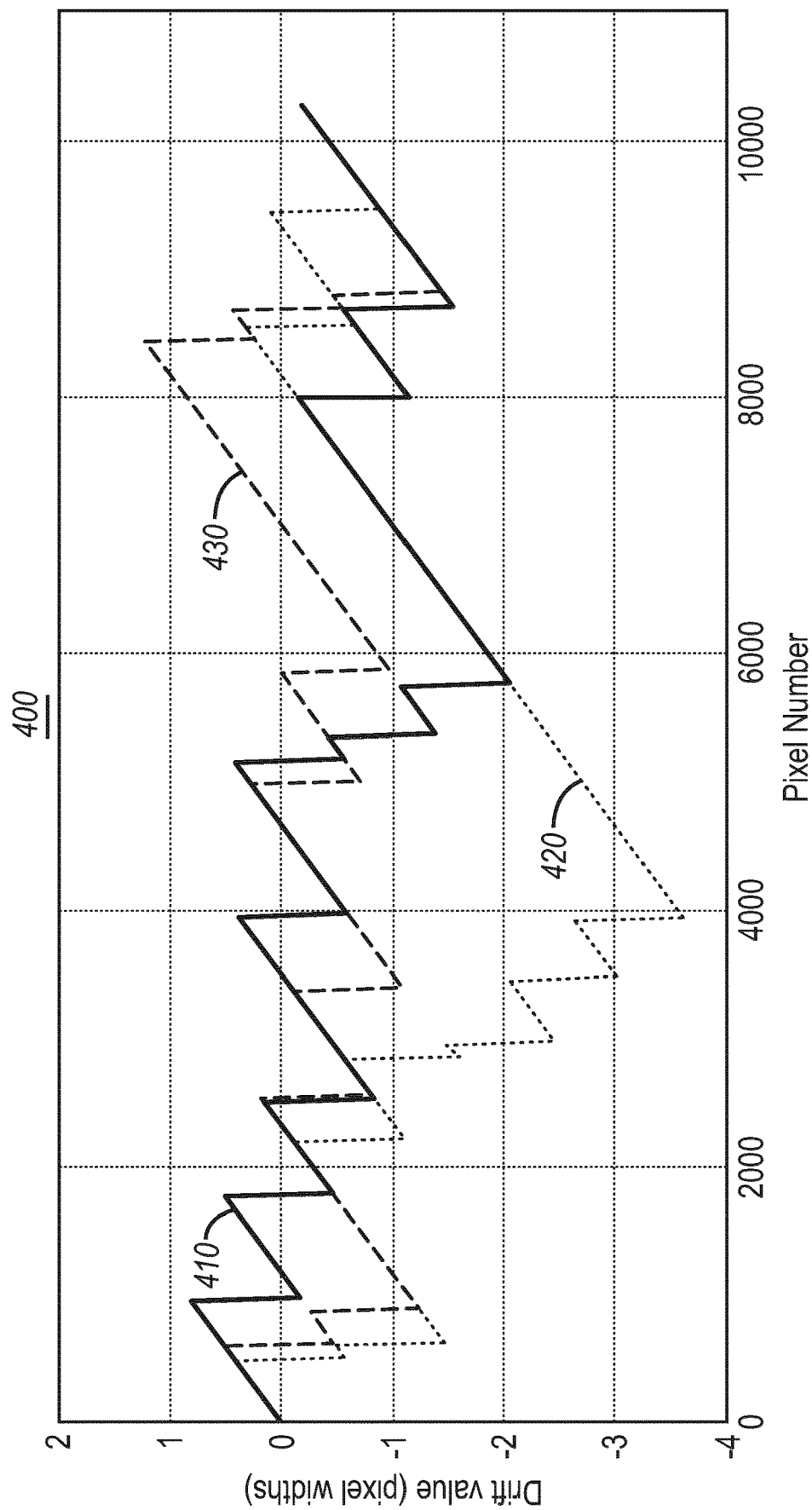
FIG. 4 is a graph depicting the drift value of pixels in a security feature after a random correction has been applied.

In another embodiment, calculating the number of pixels 114 to be removed or added in each row or column comprises determining the greatest drift value in a row or column, calculating an alteration number equal to the greatest drift value divided by a width of one of the pixels 114 and then rounded to the nearest integer; and setting the number of pixels to be removed from or added to the printed image as equal to alteration number. FIG. 4 shows graph 400 having three lines 410, 420, 430. Each line 410, 420, 430 represents the drift values of pixels in a different exemplary row or column once this random correction has been applied. As shown, each line 410, 420, 430 is corrected at random locations (indicated by the step-change in each line) which prevents the formation of grids of noise in the final design. Only three lines 410, 420, 430 are shown for illustrative purposes. It will be understood that such a line could be drawn for each row and column in the final design. As shown, this method of calculating how many pixels to remove or add will result in a drift value at the end of each row or column that is close to zero, and therefore a user will see the same frame at one end of a row or column as they do at the other end, and will reduce the number of locations where a user sees a different frame from the intended frame. The alteration number may be defined as; =RoundInt($D_G$/W), wherein A is the alteration number, $D_G$ is the greatest drift value, and w is the width of a pixel.

Figure 5:
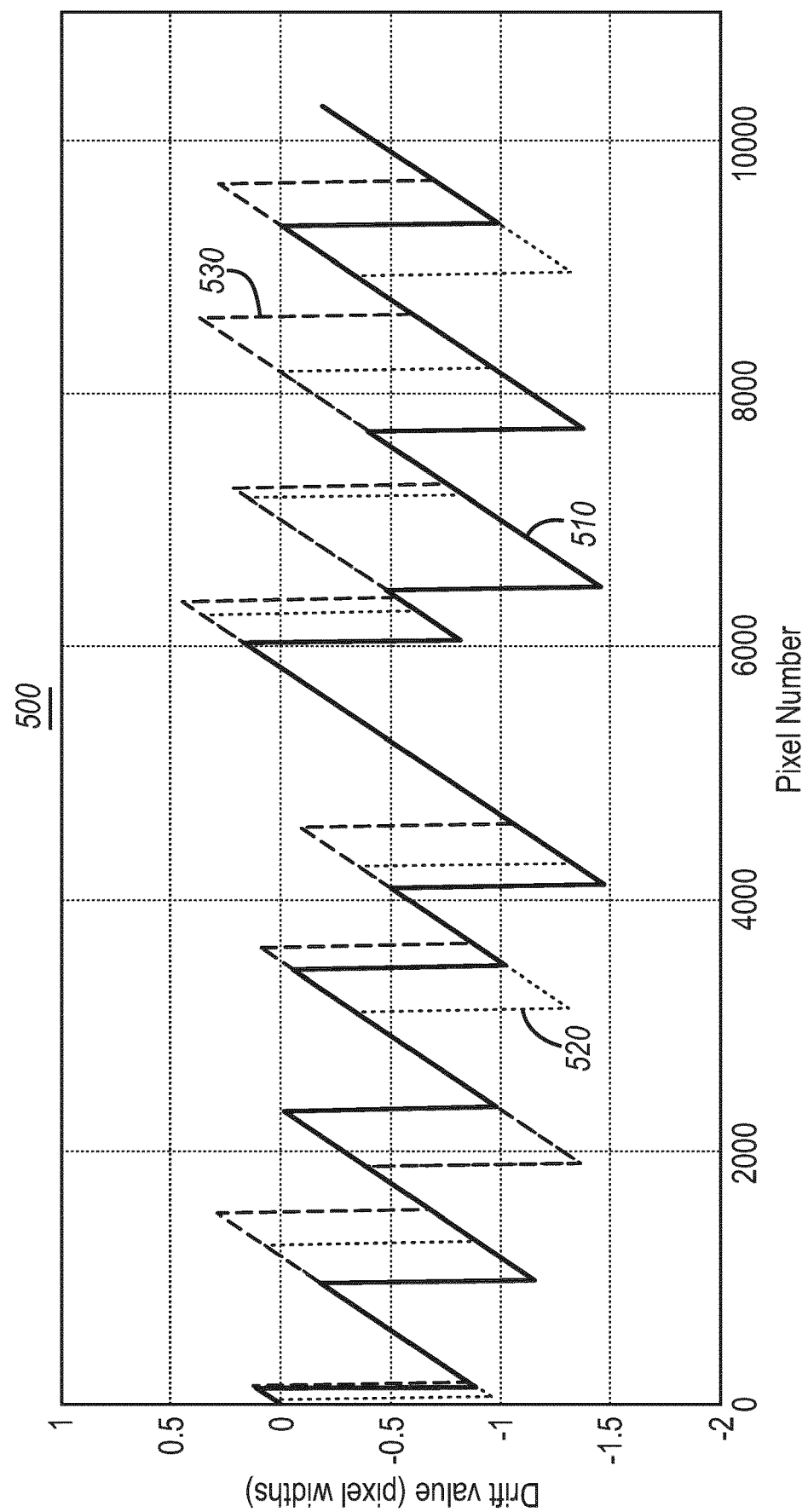
FIG. 5 is a graph depicting the drift value of pixels in a security feature after a segment correction has been applied.

In another embodiment, the method further comprises each row and column being divided into segments of equal length, wherein the number of segments is equal to the number of pixels 114 to be removed from or added to the printed image, and wherein randomly selecting that number of locations comprises randomly selecting one location in each segment. The segments may be selected such that no single optical element overlays two segments. FIG. 5 shows a graph 500 of the drift values of pixels in three rows or columns once this segment method has been applied. Lines 510, 520, 530 each represent the drift values of pixels in a different row or column once the segment method has been applied. In comparison to the embodiment shown in FIG. 4, the corrections are less random due to the segments but the lines 510, 520, 530 are still different enough to prevent the formation of grids in the final design. Only three lines 510, 520, 530 are shown for illustrative purposes. It will be understood that such a line could be drawn for each row and column in the final design.

Figure 6:
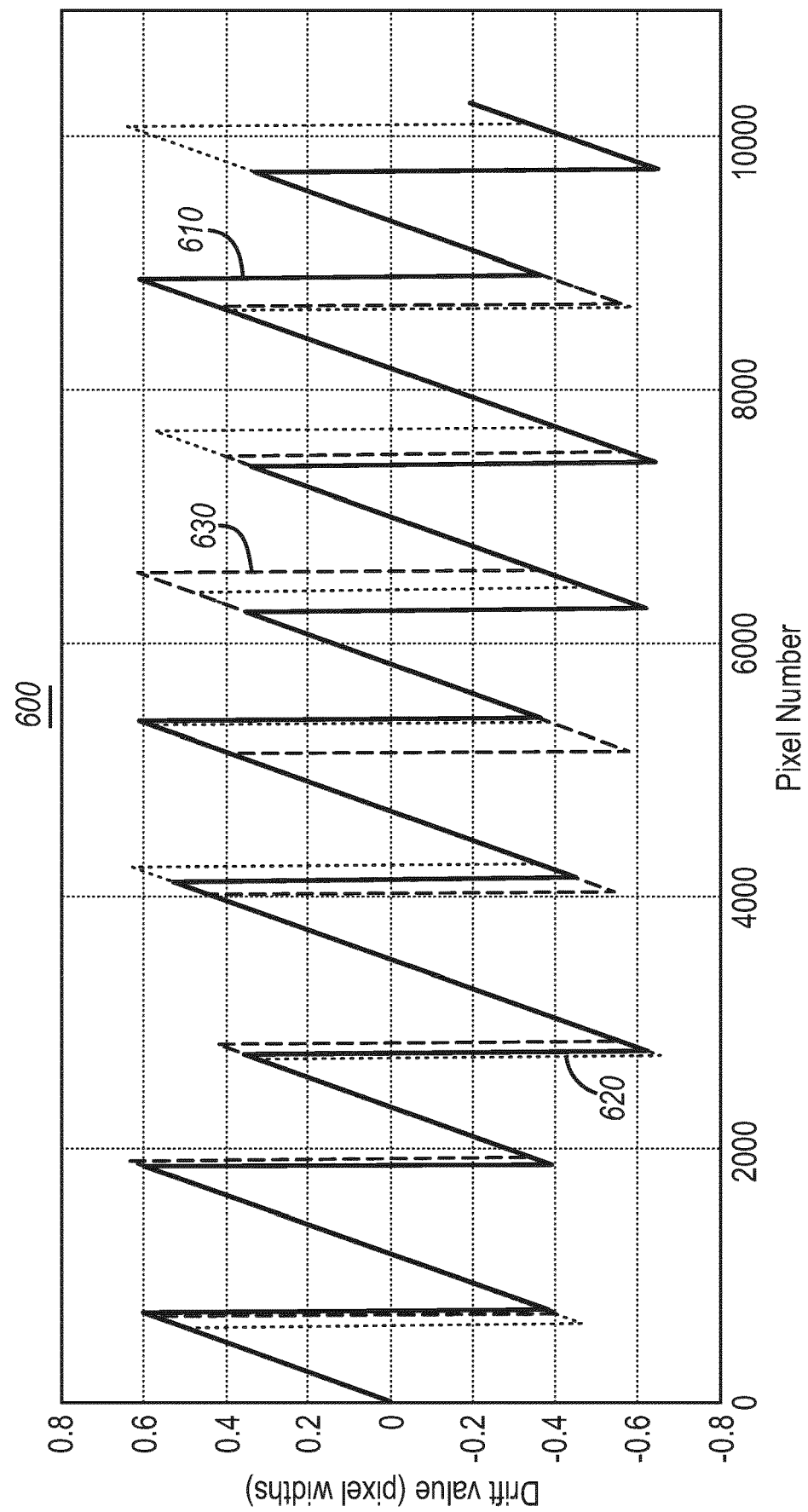
FIG. 6 is a graph depicting the drift value of pixels in a security feature after a limited distance correction has been applied.

In another alternative embodiment, the method further comprises each of the one or more locations being limited to be within a set distance of a pixel with a target drift value. That is to say, in some embodiments it may be desirable to add or remove a pixel once the drift value reaches a target value, but to not perform the correction exactly at the target drift value. To achieve this, it is specified that a pixel is added or removed from within a set distance of the pixel with the target drift value. The location where the pixel is removed or added may be randomly selected from the locations within the set distance of the pixel with the target drift value, with the distance being defined by a range of drift values around the target drift value. In preferred embodiments the target drift value may be equal to a drift value of between $(n+0.4)w$ and $(n+0.6)w$ inclusive, where n is an integer and w is the width of a pixel. In a most preferred embodiment the target drift value may be equal to a drift value of $(n+0.5)w$. In some embodiments the set distance is equal to a proportion of the distance between the locations of the pixels with the target drift values. In some further embodiments, the proportion is between zero and one. In an alternative embodiment the proportion is equal to 0.5. In a preferred embodiment, the proportion is determined by a user. In an alternative embodiment, the proportion is determined automatically by a processor. In some embodiments the set distance is an absolute distance FIG. 6 shows graph 600 depicting the drift values of pixels in three rows or columns once this limited distance method has been applied. Lines 610, 620, 630 each represent the drift values of pixels in a different row or column once the segment method has been applied. In comparison to the embodiments shown in FIG. 4 and FIG. 5 the corrections are less random due to the inclusion of the set distance, but the lines 610, 620, 630 are still different enough to prevent the formation of grids in the final design. Only three lines 610, 620, 630 are shown for illustrative purposes. It will be understood that such a line could be drawn for each row and column in the final design.

Figure 7A:
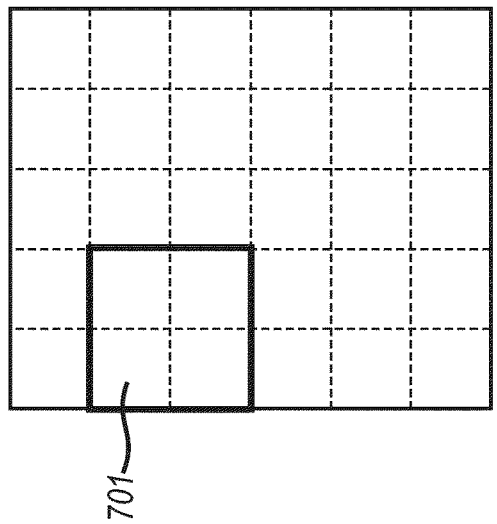
FIGS. 7A to 7C are a depiction of a virtual pixel within the printed image.
Figure 7B:
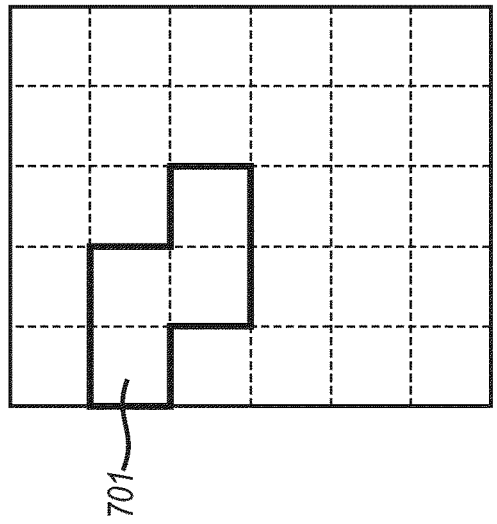
Figure 7C:
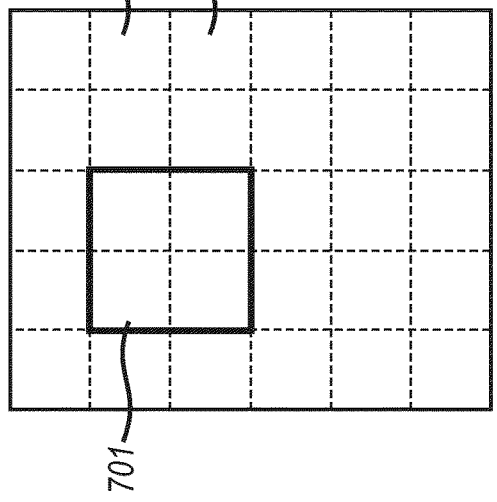

In another embodiment, the matrix of rows and columns of pixels comprises virtual pixels 701, wherein each virtual pixel 701 comprises a plurality of adjacent pixels 714, and wherein adding a pixel 714 comprises adding a virtual pixel 701, and wherein removing a pixel 714 comprises removing a virtual pixel 701. In some embodiments the virtual pixels may comprise a 2×2 block of pixels. In other embodiments the virtual pixels comprise rectangular blocks of pixels 714 of any size. In yet other embodiments the virtual pixels may comprise pixels forming any two dimensional shape. FIG. 7A depicts a matrix 700 comprising virtual pixel 701. In some embodiments, it may be calculated that a pixel 714 should be removed in a first row that would result in an alteration to the shape of a virtual pixel 701. The result of this is shown in FIG. 7B. Virtual pixel 701 is deformed such that it has lost its original shape. To prevent this, when it is determined that a pixel should be added or removed, and that one part of a virtual pixel 701 will be moved, the entire virtual pixel 701 is adjusted such that the shape of the virtual pixel 701 is maintained. This is shown in FIG. 7C where the entire virtual pixel 701 has been moved one pixel to the left.

In another embodiment, after the step of adding or removing pixels at the one or more locations, the printed image is analysed to determine if any pixels have a drift value greater in magnitude than a threshold value, and wherein a pixel with a drift value greater in magnitude than the threshold value is corrected by removing said pixel, or adding a pixel, or determining an action to minimise pixel error, and then carrying out said action. In some embodiments, after the initial changes to the design have been made, the print is analysed to see if those changes have caused a design object comprising a plurality of pixels to have extended or shrunk from a desired design position. In some embodiments, the correction of removing said pixel is applied when it is determined that a design object has extended from its desired design position. In some embodiments, this determination is made by a processor. In some embodiments, the correction of adding a pixel is applied when it is determined that a design object has shrunk from its desired design position. In some embodiments, this determination is made by a processor. The distance a pixel is allowed to overhang or underhang a frame is determined by the threshold value. In some embodiments the threshold value may be between 0.5 and 0.7 pixel widths. In some embodiments the threshold value may be equal to 0.6 pixel widths. In a preferred embodiment the threshold value may be equal to 0.5 pixel widths. It is then determined which correction should be applied. In some embodiments, determining which correction to apply comprises determining which correction will result in the smallest magnitude drift value of the adjusted pixel. In some embodiments determining an action to minimise pixel error comprises determining if moving a pixel either one place ahead or back would reduce the drift value of said pixel. In other embodiments, determining an action to minimise pixel error, and then carrying out said action may only be performed on objects comprising a single pixel. In some embodiments, this determination is made by a processor. In some embodiments the three correction methods may be applied simultaneously. In other embodiments the three correction methods may be applied sequentially.

In a second aspect of the invention, there is disclosed a method of designing a printed image in a security feature, the security feature comprising an array of optical elements overlaying the printed image, wherein the printed image comprises a two dimensional matrix of rows and columns of pixels, the method comprising: calculating for each row and column at least one drift value, wherein the drift value for a pixel is equal to the difference between an actual position for said pixel and the desired position for said pixel; determining, based on said at least one drift value, one or more locations in the printed image to remove a pixel from the printed image and/or to add a pixel to the printed image; and adding or removing pixels at the one or more locations; wherein each optical element is associated with a group of pixels, wherein each of the one or more locations is selected from a group of pixels which contains a pixel having a drift value associated with a specified drift value. Embodiments according to this aspect of the invention may be referred to as 'short pitch correction'.

That is to say, it may be determined that there are specific drift values at which a correction should be made, to reduce the average drift value of the pixels. If the average drift value of the pixels is reduced, this reduces the number of incorrect frames that a user will see when viewing the image from different angle. In some embodiments the group of pixels associated with each optical element comprise all pixels underlying the optical element. In some embodiments, a pixel having a drift value associated with a specified drift value may comprise the pixel having a drift value closer to the specified drift value than any other pixel.

In an alternative embodiment, a pixel having a drift value associated with a specified drift value may comprise the pixel having a drift value that is greater in magnitude than the specified drift value but smaller in magnitude than any other pixel having a drift value greater in magnitude than the specified drift value. In another alternative embodiment, a pixel having a drift value associated with a specified drift value may comprise the pixel having a drift value that is smaller in magnitude than the specified drift value but greater in magnitude than any other pixel having a drift value smaller in magnitude than the specified drift value. In some embodiments the specified drift value may be determined by a user. In alternative embodiments the specified drift value may be determined by a processor.

Figure 8:
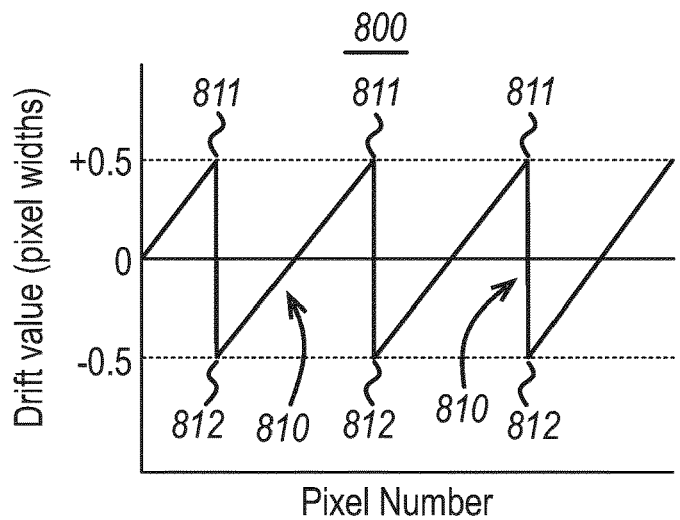
FIG. 8 is a graph depicting the drift value of pixels in a security feature after a short pitch correction has been applied.

In some embodiments, the magnitude of the specified drift value for each of the one or more locations may be any drift value. In some preferred embodiments, the magnitude of the specified drift value for each of the one or more locations may be between (n+0.4)w and (n+0.6)w, wherein n is an integer and w is the width of a pixel. In a most preferred embodiment, the magnitude of the specified drift value for each of the one or more locations may be equal to; (n+0.5)w, wherein n is an integer and w is the width of a pixel. That is to say, the specified drift value at each of the one or more locations may be 0.5 pixel widths, 1.5 pixel widths, 2.5 pixels widths, 3.5 pixel widths, 4.5 pixels widths, 5.5 pixel widths, 6.5 pixel widths, 7.5 pixel widths, 8.5 pixels widths, 9.5 pixel widths, etc. FIG. 8 depicts graph 800 demonstrating the pitch values of pixels across a row or down a column after a short pitch correction has been performed according to this most preferred embodiment. Line 810 shows that the method results in an image where no pixel has a drift value exceeding 0.5 pixel widths, as each time the pitch increases to 0.5 pixel widths 811 a pixel is removed and the pitch decreases to −0.5 pixel widths 812. Graph 800 depicts the scenario where the actual positon for each pixel is greater than the desired position for each pixel, as a result of either the pixels having a size greater than the nominal design size, or the optical elements having a size smaller than the nominal design size. Graph 800 would appear mirrored in the x-axis as a result of either the pixels having a size smaller than the nominal design size, or the optical elements having a size greater than the nominal design size.

In another embodiment, for each of the one or more locations, if the drift value is positive, a pixel is removed, and wherein if the drift value is negative, a pixel is added. Graph 800 depicts an image with positive drift values, and as detailed herein, an image with negative drift values would result in graph 800 being mirrored in the x-axis. The inventor has found that several different techniques for selecting which pixel to add or remove can be advantageous in different scenarios, and these different techniques are detailed below.

In one embodiment, adding or removing pixels comprises either: removing a pixel from the edge of each group of pixels; or adding a pixel at the edge of each group of pixels. In some embodiments the added pixel may be blank. In other embodiments the added pixel may be black. In other embodiments the added pixel may be white. In other embodiments the added pixel may be any colour.

Figure 9:
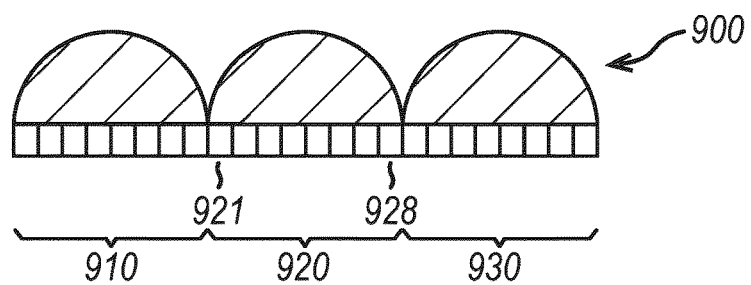
FIG. 9 is a cross sectional view of optical elements overlying groups of pixels.

In another embodiment, adding or removing pixels comprises either; removing a random pixel from each group of pixels; or adding an additional pixel to each group of pixels, wherein the additional pixel is inserted into each group of pixels at a random point within the group. In some embodiments the additional pixel may be white. In other embodiments the additional pixel may be white. In other embodiments the additional pixel may be any colour. By adding or removing a random pixel in each group the adjustment is shared across all the frames, and this is especially beneficial in images with a lot of frames, as the adjustment is less noticeable in any given frame. FIG. 9 depicts exemplary optical elements 900 overlying groups of pixels 910, 920 and 930. In this example it has been determined that one of the pixels in group 920 has a drift value associated with a specified drift value, and the drift value is positive. If the method of removing pixels is to remove a pixel from the edge of a group containing a specified drift value then pixel 921 may be removed. Alternatively, pixel 928 (which is adjacent the opposite edge of the group) may be removed. If the method of removing pixels comprises removing a random pixel from each group of pixels, then any of the pixels in group 920 may be removed, and it would be randomly selected which one was removed.

In another embodiment, adding or removing pixels comprises either; removing a least significant pixel from each group of pixels; or adding an additional pixel to each group of pixels, wherein the additional pixel is the least significant pixel in the group once it has been inserted into the group. The least significant pixel may be calculated by analysing the pixels in each group to determine which pixel would generate the least change to the printed image if removed, or an additional pixel is added. Analysing the pixels in each group may comprise determining the largest continuous set of pixels in the group of the same colour. For example, a group of pixels may comprise pixels of a certain colour and blank pixels arranged as "10011000111001010100" where "1" represents a pixel of a certain colour and "0" represents a blank pixel. In this example, the least significant pixel may be identified as being located in either the "000" or the "111" part of the group, as they represent the largest continuous set of pixels of the same colour. If the drift value was positive for this group of pixels, it may then be determined that the central "0" or the central "1" of the identified parts of the group should be removed. If the drift value was negative for this group of pixels, it may then be determined to either add a "0" to the "000" part of the group, or to add a "1" to the "111" part of the group. Adding or removing a least significant pixel to or from each group of pixels may reduce the visible error which arises due to pitch drift.

In a third aspect of the invention, there is provided a method of designing a printed image in a security feature, the security feature comprising an array of optical elements overlaying the printed image, wherein the printed image comprises a two dimensional matrix of rows and columns of pixels, the method comprising; identifying a plurality of objects within the printed image, wherein each of the plurality of objects comprises one or more pixels; wherein at least one of the plurality of objects is adjusted by moving all the pixels in the object a specified distance. In some embodiments the specified distance may be selected by a user. In other embodiments, the specified distance may be selected by a processor. Adjusting at least one of the plurality of objects may result in different effects across an image. Moving all the pixels in an object the specified distance may result in the pixels in the object having drift values close to zero. Alternatively, moving all the pixels in an object the specified distance may result in the pixels in the object having drift values that change from positive to negative, or from negative to positive. In some embodiments, at least one of the plurality of objects may not be adjusted. Embodiments according to this aspect of the invention may be referred to as 'Area pitch correction'.

In some embodiments, a second object of the plurality of objects is adjusted by moving all the pixels in the second object a second specified distance, wherein the second specified distance is different from the specified distance. This may allow for different levels of adjustment for different objects, and this may result in different effects being visible on the same image. In one embodiment, different flashing and/or rippling effects may be present on the same image. In some embodiments, many of the plurality of objects are adjusted by moving all the pixels in said objects set distances. These set distances may differ between some or all of the objects. In some embodiments at least two of the plurality of objects may be adjusted by moving all the pixels in the at least two objects a common distance, wherein the common distance is the same for the at least two objects.

In another embodiment, the distance any object is moved is based on the objects location in the printed image. In some embodiments, the distance being based on the objects location in the printed image may comprise the distance being based on a nominal drift value for the object which might be based on, for example, the average drift value of pixels in the object. In other embodiments, the distance being based on the average drift value of pixels in the object may comprise the distance being determined as the distance that results in a minimisation of the average drift value of pixels in the object. In alternative embodiments, the distance being based on the average drift value of the pixels may comprise the distance being determined such that the average drift value of the pixels becomes a chosen value. In some embodiments the nominal drift value may be equal to the drift value at an edge of the object. In some embodiments the chosen value may be determined by the user. In other embodiments the chosen value may be determined by a processor.

In another embodiment, the printed image comprises a series of frames, wherein the frames are different frames of an animation or different perspective views of an image, and wherein the frames are interlaced in the two dimensional matrix, and wherein for each object in the plurality of objects, identifying an object comprises; determining that the object comprises all pixels representative of a feature across all frames. In some embodiments determining that the object comprises all pixels representative of a feature across all frames may be performed by a processor. In some embodiments, all pixels representative of a feature across all frames may comprise blank pixels. In some embodiments, the processor may determine all the pixels representative of a feature based on the frames of the printed image. That is, the processor may be told which frames are representative of an object, and can keep track of this information such that the processors knows where each object begins and ends. The processor may also assign a value to the pixels of each object that does not vary as the pixels are adjusted. As such, the processor may keep track of which pixels belong to which object. In some embodiments a feature may be defined as a particular section of a frame, distinct from other sections of the frame. For example, a feature may correspond to a particular abstract object within a scene represented in the frame, or a visually distinct section of the frame, such as an area with a particular pattern or colour. In some embodiments, a processor may split the printed image into designated areas comprising the same effect. In some embodiments each designated area is assigned a value. In some embodiments a feature may comprise all adjacent pixels with the same assigned value. In some embodiments the effect may be a colour flip. In other embodiments, a feature may comprise all pixels that form a shape in one view of the printed image. In some embodiments, all pixels in a shape are assigned a value. In some embodiments, all pixels that form part of the shape in an alternate view of the printed image are also assigned the same value. In some embodiments, a feature may comprise all pixels with the same assigned value.

Figure 10A:
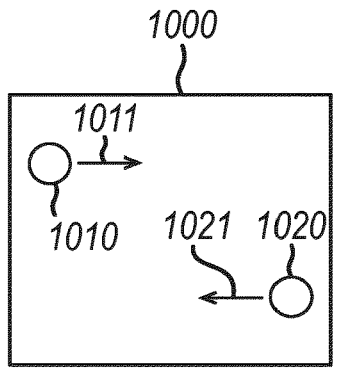
FIGS. 10A to 10D depicts how objects may be identified in an image.
Figure 10B:
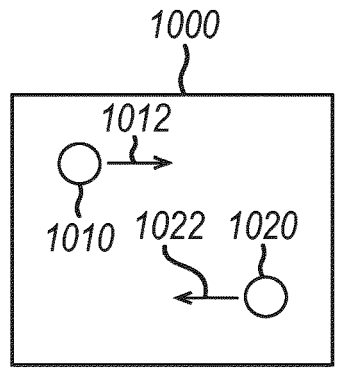
Figure 10C:
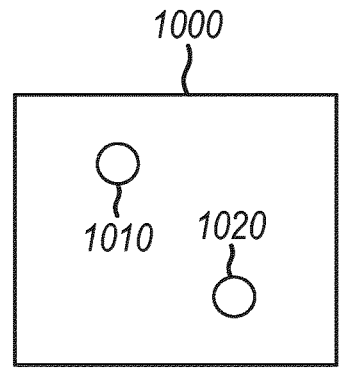

FIGS. 10A to 10D depict an example of the above detailed method, in particular, FIGS. 10A to 10O represent different frames within an animation. FIG. 10A shows an animation frame comprising features 1010 and 1020. In the course of this exemplary animation, features 1010 and 1020 appear to move across the image, in particular, feature 1010 appears to a user to move in the direction indicated by arrow 1011, and feature 1020 appears to a user to move in the direction indicated by arrow 1021. FIG. 10B shows a later frame in the animation, with the features 1010, 1020 having moved positions, with arrows 1012 and 1022 indicating the continued apparent direction of movement of objects 1010 and 1020. FIG. 10C illustrates a further frame of the animation.

As explained above, in the final security feature, different frames of the animation are viewable through the array of optical elements depending on the angle at which the security feature is viewed. In this example, the first, second and third frames of FIGS. 10A, 10B and 10O are respectively associated with first, second and third viewing angles. In this example, the first angle and the third angle represent the most extreme positions of features 1010 and 1020.

Figure 10D:
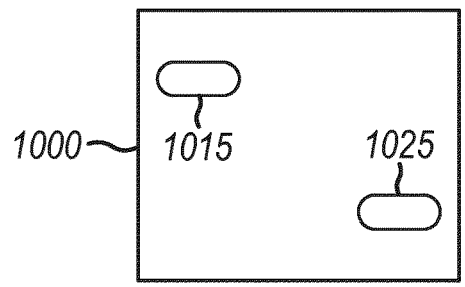

FIG. 10D illustrates the image which is formed once the frames of the animation illustrated in FIGS. 10A to 10O have been interlaced. In this third aspect of the invention, it may be determined that all of the locations at which feature 1010 appears when viewed from any angle form part of identified object 1015, including the locations which, when viewed from certain angles, comprise blank pixels. When an adjustment is applied to object 1015, all pixels within object 1015 are adjusted the same distance, such that feature 1010 is not distorted. Similarly object 1025 may comprise all the pixels that form part of feature 1020 when viewed from any angle.

To adjust each of objects 1015 and 1025, the nominal pitch drift of that object will be determined, which might be the average pitch drift of all pixels across that object, or the minimum or maximum pitch drift across that object, or some other value representative of the pitch drift of the object. In this example, the nominal pitch drift of object 1015 may be smaller than that of object 1025 because the object is closest to the top-left of the image, which is associated with a pitch drift value of zero (for the rows and columns of pixels).

Having determined a nominal pitch drift value for each of the objects, the object will then be corrected by shifting all pixels associated with that object in a particular direction to compensate for the nominal pitch drift. For example, if it had been determined that the nominal pitch drift of object 1025 was +3 pixels horizontally and +2 pixels vertically, all pixels associated with that object might be shifted 3 pixels' distance to the left, and 2 pixels' distance upwards.

By correcting the pitch drift of entire objects, tracked across multiple frames of animation, it is possible to correct for the effects of pitch drift whilst preventing noticeable distortion of features within the animated image, in any given frame or between frames of the animation.

In another embodiment, there is disclosed a method of producing a printed image in a security feature comprising; designing the printed image in the security feature according to any of the methods detailed herein; and fabricating the security feature.

In another embodiment, there is disclosed a security feature comprising a printed image, wherein the printed image is designed according to any of the methods detailed herein. In some embodiments, the security feature may further comprise an array of optical elements. In some embodiments the optical elements may be any of the exemplary optical elements disclosed herein. In another embodiment, a security document may comprise the security feature disclosed herein. In some embodiments the security document may be a banknote. In other embodiments the security document may be any of a passport, a driver's licence, ID card, or other governmental document.

In another embodiment, there is disclosed a non-transitory computer readable medium storing computer readable instructions which, when executed, cause a machine comprising a processor to perform any of the methods disclosed herein.

The invention claimed is:

1. A method of designing a printed image in a security feature, the security feature comprising an array of optical elements overlaying the printed image, wherein the printed image comprises a two dimensional matrix of rows and columns of pixels, the method comprising:
   calculating for each row and column at least one drift value, wherein the drift value for any pixel is equal to the difference between an actual position for said pixel and the desired position for said pixel;
   determining, based on said at least one drift value, one or more locations in the printed image to remove a pixel from the printed image and/or to add a pixel to the printed image; and
   adding or removing at least one pixel at the one or more locations;
   wherein the one or more locations are determined by calculating a number of pixels to be removed from or added to the printed image and randomly selecting that number of locations.

2. The method of claim 1, wherein the step of adding or removing at least one pixel comprises, for each of the one or more locations, if the drift value is positive, removing a pixel, and if the drift value is negative, adding a pixel.

3. The method of claim 1, wherein, for each row and column in the printed image, the step of calculating the number of pixels to be removed from or added to the printed image comprises:
   determining a greatest drift value in the row or column;
   calculating an alteration number equal to the greatest drift value divided by a width of one of the pixels and then rounded to the nearest integer; and
   setting the number of pixels to be removed from or added to the printed image as equal to alteration number.

4. The method of claim 1, wherein each row and column is divided into segments of equal length, wherein the number of segments is equal to the number of pixels to be removed from or added to the printed image, and wherein randomly selecting that number of locations comprises randomly selecting one location in each segment.

5. The method of claim 1, wherein each of the one or more locations is limited to be within a set distance of a pixel with a target drift value.

6. The method of claim 1, wherein the matrix of rows and columns of pixels comprises virtual pixels, wherein each virtual pixel comprises a plurality of adjacent pixels, and wherein adding a pixel comprises adding a virtual pixel, and wherein removing a pixel comprises removing a virtual pixel.

7. The method of claim 6, wherein the virtual pixel comprises a 2×2 block of pixels.

8. The method of claim 1, wherein after the step of adding or removing pixels at the one or more locations, the printed image is analysed to determine if any pixels have a drift value greater in magnitude than a threshold value, and wherein a pixel with a drift value greater in magnitude than the threshold value is corrected by:
   removing said pixel; or
   adding a pixel; or
   determining an action to minimise pixel error, and then carrying out said action.

9. The method of claim 1, wherein the printed image comprises a series of frames, wherein the frames are different frames of an animation or different perspective views of an image, and wherein the frames are interlaced in the two dimensional matrix.

10. A method of designing a printed image in a security feature, the security feature comprising an array of optical elements overlaying the printed image, wherein the printed image comprises a two dimensional matrix of rows and columns of pixels, the method comprising:
    calculating for each row and column at least one drift value, wherein the drift value for a pixel is equal to the difference between an actual position for said pixel and the desired position for said pixel;
    determining, based on said at least one drift value, one or more locations in the printed image to remove a pixel from the printed image and/or to add a pixel to the printed image; and
    adding or removing at least one pixel at the one or more locations;
    wherein each optical element is associated with a group of pixels,
    wherein each of the one or more locations is selected from a group of pixels which contains a pixel having a drift value associated with a specified drift value.

11. The method of claim 10, wherein the step of adding or removing at least one pixel comprises for each of the one or more locations, if the drift value is positive, removing a pixel, and if the drift value is negative, adding a pixel.

12. The method of claim 10, wherein adding or removing pixels comprises either:
    removing a pixel from the edge of each group of pixels; or
    adding a pixel at the edge of each group of pixels.

13. The method of claim 10, wherein adding or removing pixels comprises either;
    removing a random pixel from each group of pixels; or
    adding an additional pixel to each group of pixels, wherein the additional pixel is inserted into each group of pixels at a random point within the group.

14. The method of claim 10, wherein adding or removing pixels comprises either:
    removing a least significant pixel from each group of pixels; or
    adding an additional pixel to each group of pixels, wherein the additional pixel is the least significant pixel in the group once it has been inserted into the group.

15. The method of claim 10, wherein the magnitude of the specified drift value for each of the one or more locations is equal to:
    $(n+0.5)w$,
    wherein n is an integer and w is the width of a pixel.

16. The method of claim 10, wherein the printed image comprises a series of frames, wherein the frames are different frames of an animation or different perspective views of an image, and wherein the frames are interlaced in the two dimensional matrix.

17. A method of designing a printed image in a security feature, the security feature comprising an array of optical elements overlaying the printed image, wherein the printed image comprises a two dimensional matrix of rows and columns of pixels, the method comprising:
    identifying a plurality of objects within the printed image, wherein each of the plurality of objects comprises one or more pixels;
    wherein at least one of the plurality of objects is adjusted by moving all the pixels in the object a first specified distance based on a nominal drift value for the object.

18. The method of claim 17, wherein a second object of the plurality of objects is adjusted by moving all the pixels in the second object a second specified distance, wherein the second specified distance is different from the first specified distance.

19. The method of claim 18, wherein the distance an object is moved is based on that object's location in the printed image.

20. The method of claim 17, wherein the printed image comprises a series of frames, wherein the frames are different frames of an animation or different perspective views of an image, and wherein the frames are interlaced in the two dimensional matrix, and wherein for each object in the plurality of objects, identifying an object comprises:
   determining that the object comprises all pixels representative of a feature across all frames.

21. A method of producing a printed image in a security feature comprising:
   designing the printed image in the security feature according to the method of claim 1; and
   fabricating the security feature.

22. A security feature comprising a printed image, wherein the printed image is designed according to the method of claim 1.

23. The security feature of claim 22, further comprising an array of optical elements.

24. A security document comprising the security feature of claim 22.

25. A non-transitory computer readable medium storing computer readable instructions which, when executed, cause a machine comprising a processor to perform the method of claim 1.

* * * * *